United States Patent [19]
George et al.

[11] 3,917,982
[45] Nov. 4, 1975

[54] ELECTRICAL PROTECTOR ASSEMBLY
[75] Inventors: E. Paul George, Saratoga; Robert Nelson Lincoln, Cupertino, both of Calif.
[73] Assignee: TRW, Inc., Los Angeles, Calif.
[22] Filed: Dec. 12, 1974
[21] Appl. No.: 532,024

[52] U.S. Cl. .................. 317/61.5; 317/62; 337/32; 337/34
[51] Int. Cl.² ........................................ H02H 1/04
[58] Field of Search .......... 317/61, 61.5, 62, 66, 69, 317/31, 101 C, 116, 117; 339/111, 17 C, 17 CF, 17 LC; 337/34, 32, 28, 29

[56] References Cited
UNITED STATES PATENTS

| | | | |
|---|---|---|---|
| 2,555,330 | 6/1966 | MacKenzie et al. | 337/32 |
| 2,859,423 | 11/1958 | Hyman | 317/61 X |
| 3,340,431 | 9/1967 | Wanaselja | 317/61 X |
| 3,535,779 | 10/1970 | Wanaselja | 337/32 X |
| 3,851,220 | 11/1974 | Charles | 317/62 X |

Primary Examiner—J. D. Miller
Assistant Examiner—Patrick R. Salce
Attorney, Agent, or Firm—Flehr, Hohbach, Test, Albritton & Herbert

[57] ABSTRACT

Assembly for protecting telephone equipment from damage due to lightning or other high voltages on lines connected to the equipment. The assembly includes a housing comprising a base and a removable snap-on cover in which a plurality of protective devices are removably mounted in a plug-in manner. Each of the protective devices is mounted in a socket having a pair of contacts connected to external wire receiving terminals and a third contact connected to a ground buss. The cover is provided with a slotted opening which provides ventilation and permits observation of the protective devices.

7 Claims, 3 Drawing Figures

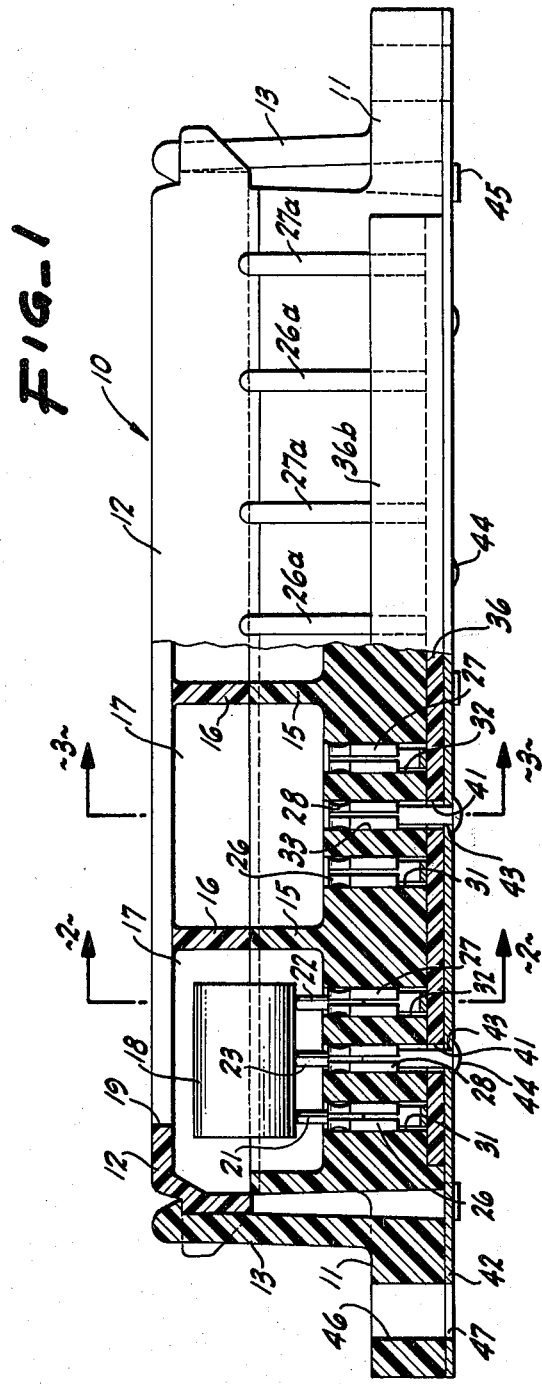
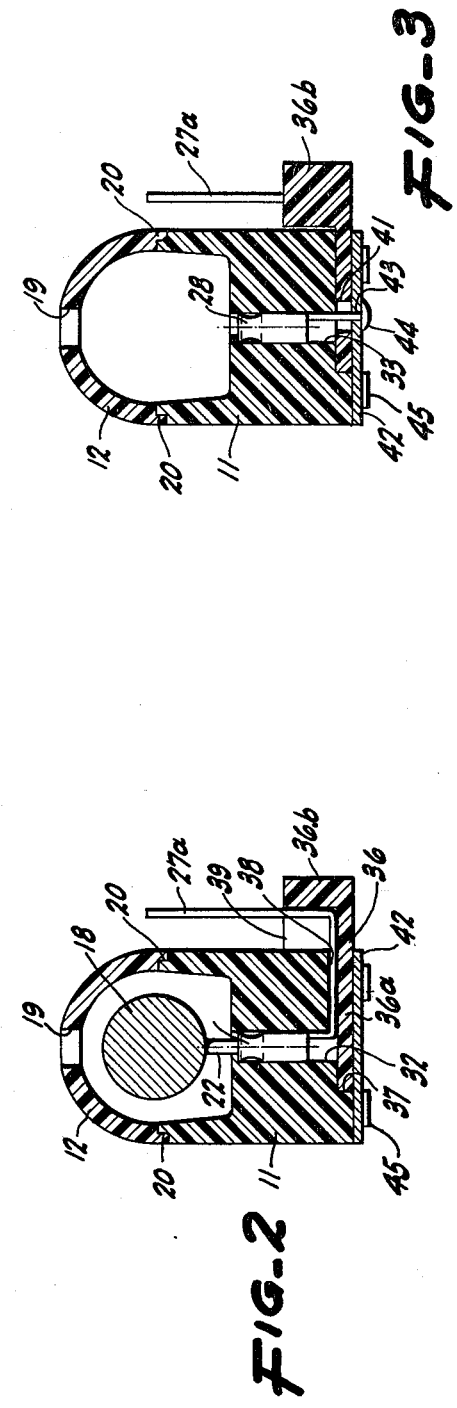

_ELECTRICAL PROTECTOR ASSEMBLY_

BACKGROUND OF THE INVENTION

This invention pertains generally to telephone equipment and more particularily to devices for protecting telephone equipment from damage due to lightning or other high voltages on lines to which the equipment is connected.

Telephone equipment located at different locations and interconnected by lines extended between the locations is subject to damage from high voltages imposed on the lines, as might, for example, result from lightning striking the lines or a wire carrying a high voltage falling into contact with the lines. To protect the equipment from such damage, protective devices have been provided. These devices are typically gas-discharge devices having two terminals which are connected to the line and equipment and a third terminal which is connected to ground. Under normal conditions, the protective device provides a circuit between the line and telephone equipment connected to the first two terminals. In the event that the voltage on the line exceeds a predetermined level, the circuit is interrupted and the line terminal is connected to the ground terminal, shunting the high voltage to ground.

SUMMARY AND OBJECTS OF THE INVENTION

The invention provides an assembly for holding a plurality of protective devices for connection to telephone equipment and lines. The assembly comprises a base, a removable snap-on cover, a contact retainer and a buss bar. The protective devices are removably mounted in a plug-in manner in the housing formed by the base and cover. Each of the protective devices is mounted in a socket having a pair of contacts connected to external wire receiving terminals and a third contact connected to a ground buss. The cover is provided with a slotted opening which provides ventilation and permits observation of the protective devices.

It is in general an object of the invention to provide a new and improved assembly for holding protective devices for protecting telephone equipment from damage due to lightning and other high voltages on lines to which the equipment is connected.

Another object of the invention is to provide an assembly of the above character in which the protective devices are removably mounted and can be replaced readily.

Additional objects and features of the invention will be apparent from the following description in which the preferred embodiment is set forth in detail in conjunction with the accompanying drawings.

BRIEF DESCRIPTION OF THE DRAWINGS

FIG. 1 is a side elevational view, partly broken away, of one embodiment of an electrical protector assembly according to the invention.

FIG. 2 is a cross-sectional view taken along Line 2—2 in FIG. 1.

FIG. 3 is a cross-sectional view taken along Line 3—3 in FIG. 1.

DESCRIPTION OF THE PREFERRED EMBODIMENT

As illustrated, the protector assembly comprises an elongated housing having a base 11 and a cover 12, the cover being removably mounted on the base and secured thereto by latch hooks 13. In the preferred embodiment, the base and cover are molded of an insulative polyesther material such as Valox, and latch hooks 13 are formed as integral parts of the base. The base and cover are formed to include transversely extending walls 15, 16 which define a plurality of longitudinally spaced sections 17 in which protective devices 18 are mounted. A longitudinally extending slotted opening 19 in cover 12 provides ventilation and permits observation of the protective devices in the housing. The confronting outer edges of the base and cover are formed with mating shoulders 20 which assure proper alignment when the cover is mounted on the base.

In the preferred embodiment, protective devices 18 are three terminal gas discharge devices of a known design heretofore utilized for lightning arresters and high voltage protectors. Such devices have terminals 21, 22 which are connected to a line and equipment to be protected and a third terminal 23 which is grounded. The device normally provides an electric circuit or connection between the line and equipment connected thereto, but in the event that the voltage between the line terminal and the ground terminal exceeds a predetermined level, such as 300 volts, the circuit is interrupted and the line terminal is connected to the ground terminal, shunting the high voltage to ground.

Each of the sections of the housing is provided with contacts 26–28 for engaging the terminals of the protective device mounted therein. The contacts include female portions which are mounted in bores 31–33 in base 11 and grip the terminals of the protective devices. The contacts also include elongated stems which extend from the female portions, the stems of contacts 26 and 27 being bent generally in a U-shape, as best seen in FIG. 2. The outer legs of the U-shaped stems extend outside the housing and form terminals 26a, 27a for receiving wires which in the preferred embodiment are wrapped about the terminals.

The contacts are retained in base 11 by a retainer 36 of insulative material having an inner portion 36a mounted in a recess 37 in the lower portion of the base and an outer portion 36b extending along one side of the base. The stems of contacts 26 and 27 extend through lateral slots 38 in body 11 and vertical slots 39 in the outer portion of the retainer. The inner portion of the retainer is formed to include openings 41 which are aligned with bores 33.

An electrically conductive ground buss member 42 is mounted beneath base 11 and retainer 36 and provided with openings 43 aligned with bores 33 and openings 41. The stems of contacts 28 extend through openings 41 and 43 and are soldered to the buss member, as indicated at 44. The base, retainer and buss member are held together by studs or "heat stakes" which extend from the base and pass through openings in the retainer and buss member and are deformed by heat at their outer ends, as indicated at 45.

Base 11 and buss member 42 are provided with aligned openings 46, 47 adapted to receive screw fastening devices (not shown) for securing the assembly to a suitable mounting surface.

In operation and use, the assembly is mounted on a suitable surface and buss member 42 is connected to an earth ground. Protective devices 18 are plugged into the sockets formed by contacts 26–28 in each section of the housing, and cover 12 is snapped into place on base 11. Wires are wrapped about terminal 26a and 27a to provide connections to the lines and protected equipment. Under normal conditions, the protective devices provide a connection or circuit between the lines and equipment connected to terminals 26a and 27a. In the event of a voltage on the line higher than the threshold voltage of a protective device, the device fires, shunting the high voltage to ground through contact 28 and buss member 42 to protect the equipment. The elongated slot 19 in cover 12 permits visual observation of the protective devices and provides ventilation and dissipation of heat generated when the protective devices fire.

The invention has a number of important features and advantages. It provides means for holding a plurality of protective devices of the type used to protect telephone equipment from damage due to lightning or other high voltages on lines connected to the equipment. The self-aligning snap-on cover is readily installed and removed, and the plug-in protective devices are readily replaced without soldering or making other connections.

It is apparent from the foregoing that a new and improved assembly for holding protective devices has been provided. While only the preferred embodiment has been described, as will be apparent with those familiar with the art, certain changes and modifications can be made without departing from the scope of the invention as defined by the following claims.

We claim:

1. In an assembly for holding three-terminal gas-discharge devices for protecting telephone equipment from damage due to lightning or other high voltages on lines connected to the equipment: an insulative housing comprising a base and a cover removably mounted on the base, said housing being formed to include a plurality of sections in which the devices are mounted, contacts mounted in the base in each of the sections for engaging the terminals of the devices, wire receiving terminals connected electrically to two of the contacts in each section and extending externally of the housing for connection to the telephone equipment and lines, and an electrically conductive buss bar member mounted to the base and connected electrically to a third contact in each section.

2. The assembly of claim 1 further including releasable latch hooks extending between the cover and base for securing the cover to the base.

3. The assembly of claim 1 wherein the cover is formed to include an opening through which the protective devices are visible externally of the housing.

4. The assembly of claim 1 wherein the cover and base are elongated, and the sections in which the protective devices are mounted are longitudinally spaced and separated by transverse walls.

5. In an assembly for protecting telephone equipment from damage due to lightning or other high voltages on lines connected to the equipment: an elongated insulative housing comprising a base and a cover removably mounted on the base, said housing being formed to include a plurality of longitudinally spaced sections, a protective device removably mounted in each section of the housing, each protective device normally providing a circuit between first and second terminals of the same and being adapted for interrupting the circuit and providing a discharge path between one of the terminals and a third terminal in the event that the voltage between the one terminal and the third terminal reaches a predetermined level, first, second and third contacts mounted in the base in each of the sections and engaging respectively the first, second and third terminals of the protective device mounted therein, wire terminals connected electrically to the first and second contacts in each section and extending externally of the housing for connection to the telephone equipment and lines, and an electrically conductive buss bar member mounted to the base and connected electrically to the third contact in each section.

6. The assembly of claim 5 wherein the cover is formed to include a longitudinally extending slotted opening through which the protective devices are visible externally of the housing.

7. The assembly of claim 5 further including releasable latch hooks extending between the cover and base for securing the cover to the base.

* * * * *